(12) United States Patent
Barbiro (10) Patent No.: US 10,498,609 B1
(45) Date of Patent: Dec. 3, 2019

(54) SYSTEM, METHOD, AND COMPUTER PROGRAM FOR ENTERPRISE SERVICE NETWORK DESIGN DRIVEN BY DEEP MACHINE LEARNING AND ARTIFICIAL INTELLIGENCE

(71) Applicant: Amdocs Development Limited, Limassol (CY)

(72) Inventor: Noa Barbiro, Tel Aviv-Jaffa (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 143 days.

(21) Appl. No.: 15/647,122

(22) Filed: Jul. 11, 2017

(51) Int. Cl.
*H04L 12/24* (2006.01)

(52) U.S. Cl.
CPC .................... *H04L 41/145* (2013.01)

(58) Field of Classification Search
CPC .......... H04L 41/145; H04L 2012/5623; H04Q 3/0083
See application file for complete search history.

(56) References Cited

U.S. PATENT DOCUMENTS

| | | | |
|---|---|---|---|
| 6,058,260 A | 5/2000 | Brockel et al. | |
| 6,363,420 B1* | 3/2002 | Coward | H04L 41/0816 709/220 |
| 8,082,335 B2 | 12/2011 | Mishra et al. | |
| 2002/0131374 A1* | 9/2002 | Lee | H04L 41/0206 370/254 |
| 2003/0172145 A1* | 9/2003 | Nguyen | G06Q 10/10 709/223 |
| 2017/0019302 A1* | 1/2017 | Lapiotis | H04L 41/145 |
| 2017/0054607 A1 | 2/2017 | Madaiah et al. | |
| 2018/0349189 A1* | 12/2018 | Rossi | G06F 9/50 |

FOREIGN PATENT DOCUMENTS

WO 2016026509 A1 2/2016

OTHER PUBLICATIONS

Fahmy et al., "Application of Neural Networks an Machine Learning in Network Design," Transactions on Information and Communications Technologies, vol. 16, 1996, pp. 1-10.

* cited by examiner

*Primary Examiner* — Benjamin R Bruckart
*Assistant Examiner* — Tien M Nguyen
(74) *Attorney, Agent, or Firm* — Zilka-Kotab, P.C.

(57) ABSTRACT

A system, method, and computer program product are provided for enterprise service network design driven by deep machine learning and artificial intelligence. In operation, a network design system identifies an enterprise network service project to design. The network design system receives business requirement information associated with the enterprise network service design project. Additionally, the network design system receives commercial requirement information associated with the enterprise network service design project. The network design system automatically identifies a topology and inventory items to generate the enterprise network service design project utilizing at least one neural network deep learning technique. The topology and inventory items are identified based on a current inventory and information in one or more historical project databases. The neural network deep learning technique allocates identification tasks to a plurality of neural layers for selecting an optimal service design solution for the enterprise network service design project.

12 Claims, 6 Drawing Sheets

SYSTEM, METHOD, AND COMPUTER PROGRAM FOR ENTERPRISE SERVICE NETWORK DESIGN DRIVEN BY DEEP MACHINE LEARNING AND ARTIFICIAL INTELLIGENCE

FIELD OF THE INVENTION

The present invention relates to network design, and more particularly to enterprise service network design driven by deep machine learning and artificial intelligence.

BACKGROUND

One of the strongest potential growth areas for telecommunications/information technology service providers today is the enterprise and large business domain, where service providers across the world are introducing new advanced services to their business customers, scaling the number of orders processed, and increasing the complexity of service delivery.

In order to ensure profitability for the services provided to those corporate customers and to fight increasing competition, service providers need to maintain an optimized process for providing reliable network design based on available assets. Service providers also need to be lean enough to handle all the customer needs, as well as being capable of expanding to allow modular additional value added services that can be offered to the business customer.

Telecommunications/information technology service providers are required to maximize offerings for existing connectivity or available partnerships and to establish network and service design when offering a solution to a customer that will optimize other value added services (e.g. ICT, cloud services, and other services that exploit connectivity, etc.).

With newer and advanced technology lowering entry costs for new players, service providers have become heavily dependent on the right connectivity solution with very narrow margin for errors. To ensure competitiveness, minimizing design error is a key, as errors become costly throughout the enterprise network deployment.

Currently, communication service providers have to address various issues when designing services and networks for enterprise or large business customers. For example, network designers suffer from a lack of visibility into various inventory systems. Additionally, optimization of the network design is done manually today using incumbent tools, which are often inadequate for all connectivity needs associated with the target organization. Furthermore, network design requires highly skilled network design engineers and takes a long time, which results in a costly overall service and network design process.

While customers may know which services they are interested in, they will rarely have knowledge of the underlying connectivity needs and, in many cases, may be overwhelmed with the vast number of possibilities and different options available.

There is thus a need for addressing these and/or other issues associated with the prior art.

SUMMARY

A system, method, and computer program product are provided for enterprise service network design driven by deep machine learning and artificial intelligence. In operation, a network design system identifies an enterprise network service project to design. The network design system receives business requirement information associated with the enterprise network service design project. Additionally, the network design system receives commercial requirement information associated with the enterprise network service design project. The network design system automatically identifies a topology and inventory items to generate the enterprise network service design project utilizing at least one neural network deep learning technique. The topology and inventory items are identified based on a current inventory and information in one or more historical project databases. The neural network deep learning technique allocates identification tasks to a plurality of neural layers for selecting an optimal service design solution for the enterprise network service design project.

DETAILED DESCRIPTION

Figure 1:
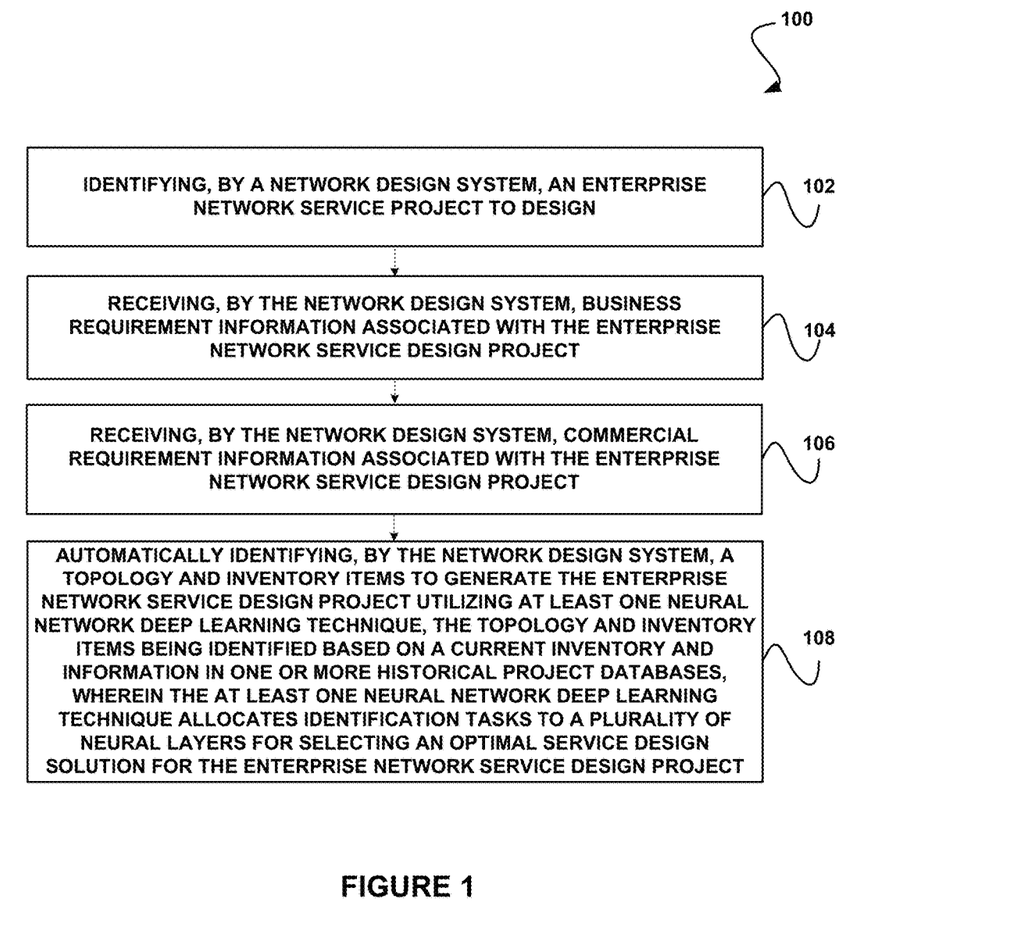
FIG. 1 illustrates a method for enterprise service network design driven by deep machine learning and artificial intelligence, in accordance with one embodiment.

FIG. 1 illustrates a method 100 for enterprise service network design driven by deep machine learning and artificial intelligence, in accordance with one embodiment.

In operation, a network design system identifies an enterprise network service design project to design. See operation 102.

The network design system receives business requirement information associated with the enterprise network service design project. See operation 104. The business requirement information may include any information associated with a customer's business, such as requirements to have a secure VPN (point-to-point) connection between certain sites, or secured connectivity to a machine (M2M) such in the case of banking and ATM connectivity and other needs, and/or any other business requirement information.

Additionally, the network design system receives commercial requirement information associated with the enterprise network service design project. See operation 106. The commercial requirement information may include any commercial related information such as the customer requiring some restrictions on the site rollout duration and scheduling (e.g. grouping different solutions together, such as an ENS connectivity solution, etc.), as well as restricting the service provider with the different partner selections for the proposed solution, etc.

In one embodiment, the business requirement information and/or the commercial requirement information may be captured in an order capture process and/or by commercial offer configuration tools, also known as CPQ (Configure Price Quote), which may be implemented by the network design system. In another embodiment, the network design system may receive this information from an order and/or price quoting system, etc.

Further, in one embodiment, the business requirement information and the commercial requirement information may be associated with a customer account profile corresponding to a customer of the enterprise network service project.

The network design system automatically identifies a topology and inventory items (e.g. equipment associated with the topology, etc.) to generate the enterprise network service design project utilizing at least one neural network deep learning technique. See operation 108. The topology and inventory items are identified based on a current inventory (e.g. of a communication service provider working on the project, etc.) and information in one or more historical project databases. The neural network deep learning technique allocates identification tasks to a plurality of neural layers for selecting an optimal service design solution for the enterprise network service design project.

The historical project databases may include any information associated with current or past enterprise service network design projects. For example, the historical project databases may include an aggregate list of a plurality of previously designed network topologies. In this case, the historical project databases may include equipment information associated with each of the designed topologies. Further, the historical project databases may include connectivity information associated with the topology. The connectivity information may include service and integration information associated with the topology.

In one embodiment, the network design system may recommend the identified topology and the inventory items to use for network design (e.g. presenting the recommendation utilizing one or more user interfaces associated with the network design system, etc.). Further, in one embodiment, the network design system may generate the optimal service design solution utilizing the topology and the inventory items. In this case, the network design system may recommend the optimal service design solution utilizing at least one user interface.

It should be noted that the method 100 may be implemented utilizing various systems, hardware, software, applications, user interfaces, etc., as dictated by the implementer. For example, the network design system implementing the method 100 may include one or more processors, databases, etc., as well as implement various logic, computer code, applications, and/or user interfaces, etc. In one embodiment, the network design system may be a system of a communication service provider.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
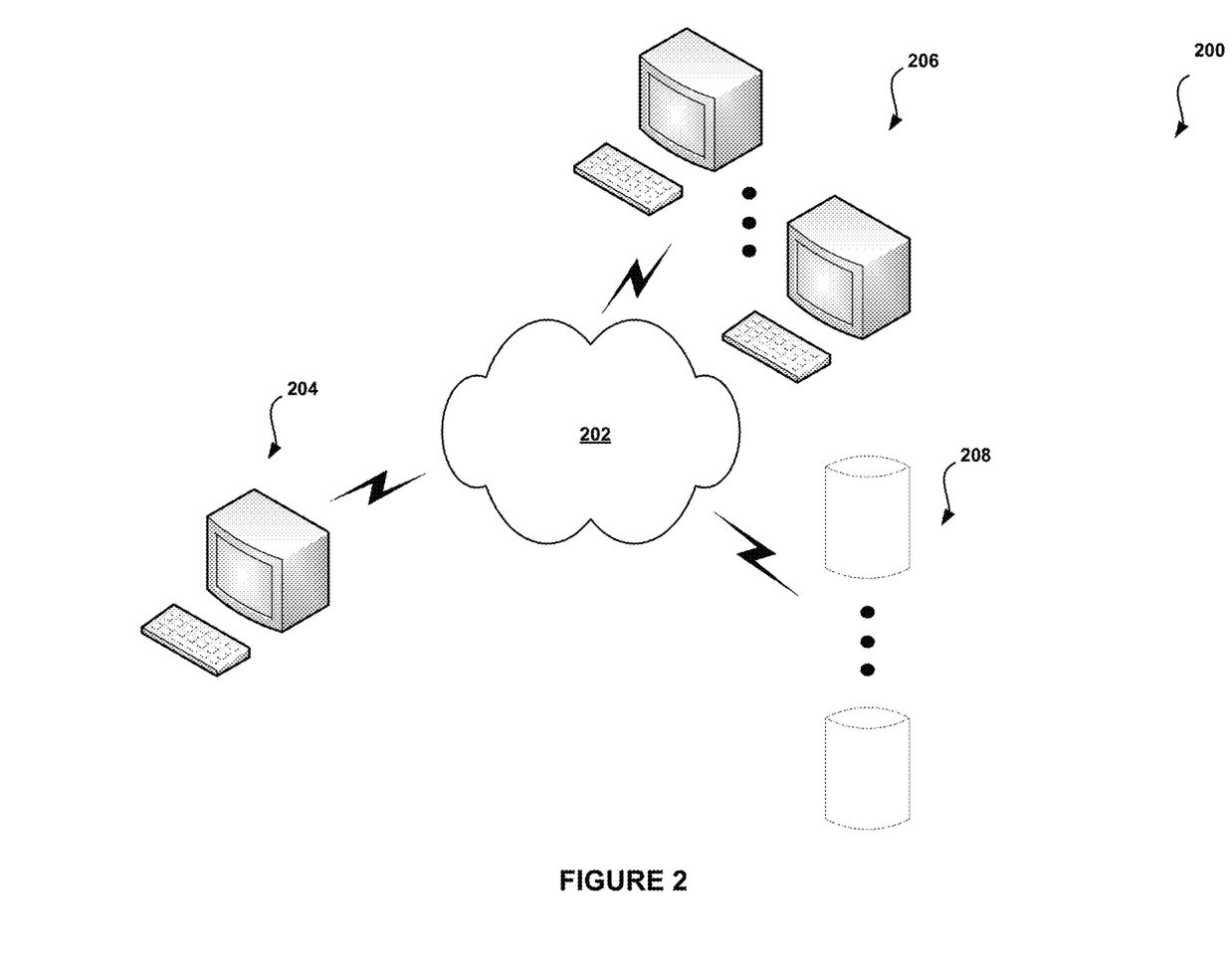
FIG. 2 shows a system for enterprise service network design driven by deep machine learning and artificial intelligence, in accordance with one embodiment.

FIG. 2 shows a system 200 for enterprise service network design driven by deep machine learning and artificial intelligence, in accordance with one embodiment. As an option, the system 200 may be implemented in the context of the details of the previous figure and/or any subsequent figure (s). Of course, however, the system 200 may be implemented in the context of any desired environment. Further, the aforementioned definitions may equally apply to the description below.

As shown, the system 200 includes a network design system 204, which may implement a variety of applications or software, etc. The network design system 204 may be capable of communicating with a plurality of systems 206, either directly or over one or more networks 202, for accessing data for enterprise service network service design.

The network design system 204 is also in communication with one or more repositories/databases 208, which may serve as a storage areas for historical project design data and inventory information, etc.

Currently, communication service providers have to address various issues when designing services and networks for enterprise or large business customers. For example, network designers suffer from a lack of visibility to various inventory systems. Additionally, optimization of the network design is done manually today using incumbent tools, which are often inadequate for all connectivity needs associated with the target organization. Furthermore, network design requires highly skilled network design engineers and takes a long time, which results in a costly overall service and network design process.

While customers may know which services they are interested in, they will rarely have knowledge of the underlying connectivity needs and, in many cases, may be overwhelmed with the vast number of possibilities and different options available.

The network design system 204 addresses these challenges (among others) by addressing a key aspect of the network design process. Instead of relying on engineering and human driven network design, the network design system 204 proactively suggests optimal service and network design for a customer, and that optimizes the service provider resources, relying on business and inventory data as well as neural machine learning and artificial intelligence techniques.

The network design system 204 may also, in one embodiment, implement a method for organizing resources and service inventory data together with customer business profiles to allow cohort selection and unassisted clustering using machine learning techniques. Further, in one embodiment, the network design system 204 may function as an automated suggestive recommendation system for optimal design with ranking and detailed selection of the relevant network resources, as well as optimal topology for the connectivity and service layout, taking advantage of a deep neural network artificial intelligence machine learning computational technique.

The network design system 204 will allow for a shorter network design cycle, as well as allowing for a significant reduction in associated costs for creation of customized networks and service designs for business customers.

The network design system 204 provides a backend engine for aggregation, insights creation, and a calculation and recommendation engine for generation of optimal service and network design In operation, the network design system 204 utilizes aggregation of data and segments creation for creating predictive insights. The basis for intelligence and machine learning starts from sufficient data. The network design system 204 can utilize this to generate predictive insights for network design.

The network design system 204 may use data retrieved or received from databases including historical (as well as recent) transactions, as well as obtaining data from real-time and batch data collection. This data collection process performed by the network design system 204 may be utilized to augment a service and resource inventory, customer account profiles, and/or topologies (e.g. location based, etc.), etc.

The network design system 204 may utilize service inventory and topologies data for generating optimal designs for customers. In this case, the service inventory and topologies data may include an aggregate list of various selected and designed topologies, including the equipment associated with each topology, as well as service and integration (connectivity) information. Further, in one embodiment, this information may be associated with customer account profiles. This may include, for example, associating customer account profiles based on the equipment, solution, and size of topologies (e.g. number of sites, etc.). The customer account profile may take into account different factors such as overlays designs, MACDs, and co-hosted topologies, etc.

The network design system 204 may also access and utilize customer account data for generating design recommendations. Such customer account information may include customer profiles for business accounts, vectors, number of sites, and/or services used to generate customer cohorts, etc. This data may be used for optimal service design selection and creation by the network design system 204 (e.g. by applying a machine learning function to apply the correct cohort of data, etc.).

In one embodiment, the network design system 204 may utilize two machine learning techniques, including assisted learning using labeled data and unassisted learning for generation and segmentations of the data into cohorts (e.g. by applying a clustering mechanism), as well as insight generation, taking advantage of modern computational technology and layering of deep neural network.

Figure 3:
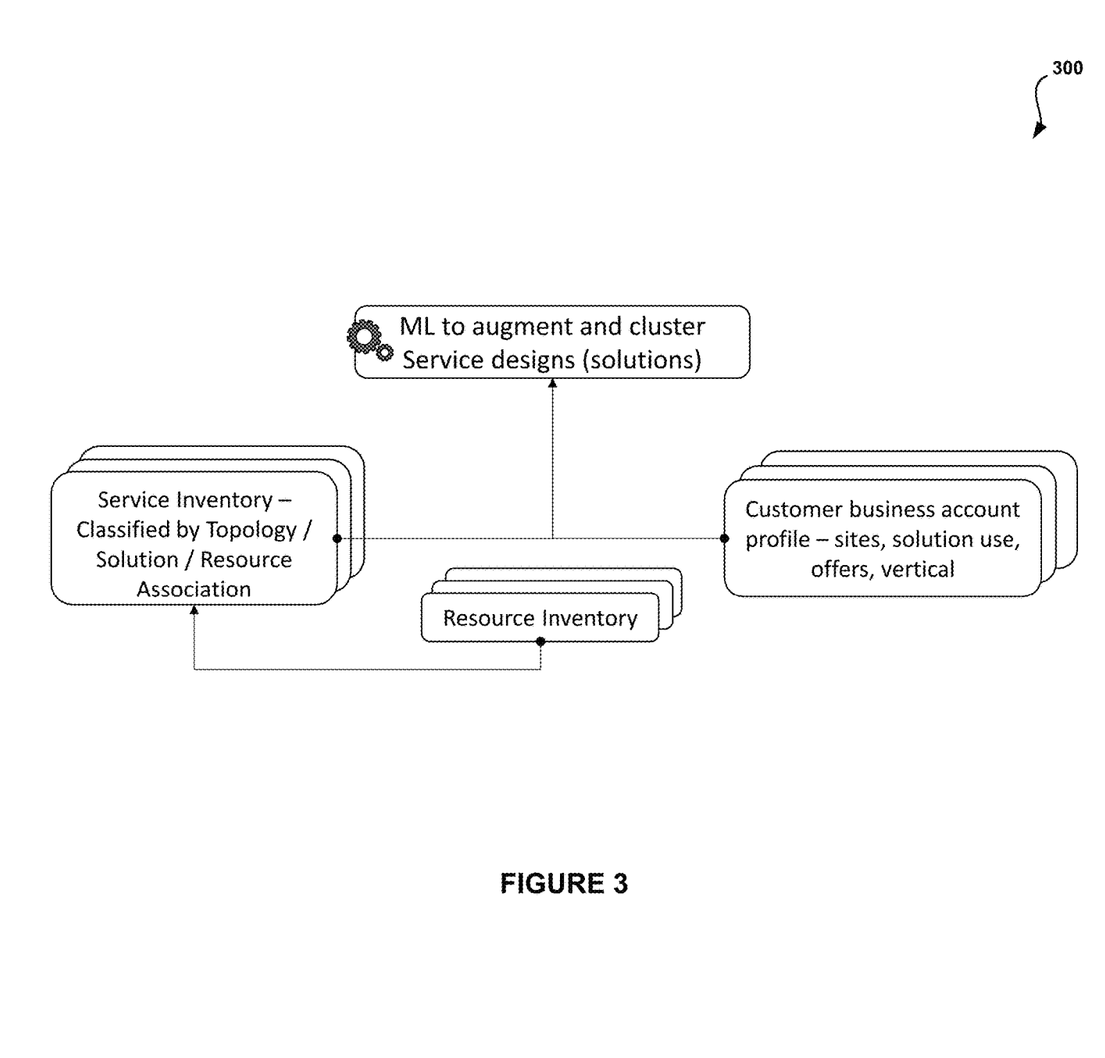
FIG. 3 shows a system flow diagram for enterprise service network design driven by deep machine learning and artificial intelligence, in accordance with one embodiment.

FIG. 3 shows a system flow diagram 300 for enterprise service network design driven by deep machine learning and artificial intelligence, in accordance with one embodiment. As an option, the system flow diagram 300 may be viewed in the context of the details of the previous figures and/or any subsequent figure(s). Of course, however, the system flow diagram 300 may be viewed in the context of any desired environment. Further, the aforementioned definitions may equally apply to the description below.

As shown, the network design system may access databases including resource inventory information, service inventory information, customer business account profile information for generating network service design recommendations and generation. The network design system may employ neural network machine learning for optimal design generation as well as to augment and cluster service designs.

Business customer and commercial requirements and needs (which lead to the needed telecom and ICT solutions) are commonly captured in an order capture and by commercial offer configuration tools. Once business and commercial requirements have been captured/received, as well as customer profiles being established, in one embodiment, the network design system may use different service decomposition functions in order to decompose those commercial requirements into corresponding CFS (Customer Facing Service) and RFC (Resource Facing Service) that can ignite the design process. In another embodiment, the network design system may provide an approximate suggestive CFS corresponding to a relevant cohort, location, and customer profile needs, as provided by an insight engine of the network design system.

At this point, the network design system may use a neural network deep learning technique to browse through similar 'experiences' (i.e. typical topologies answering similar needs, etc.) from the data set while breaking down the work into different neural layers to match the optimal service design solution.

Figure 4:
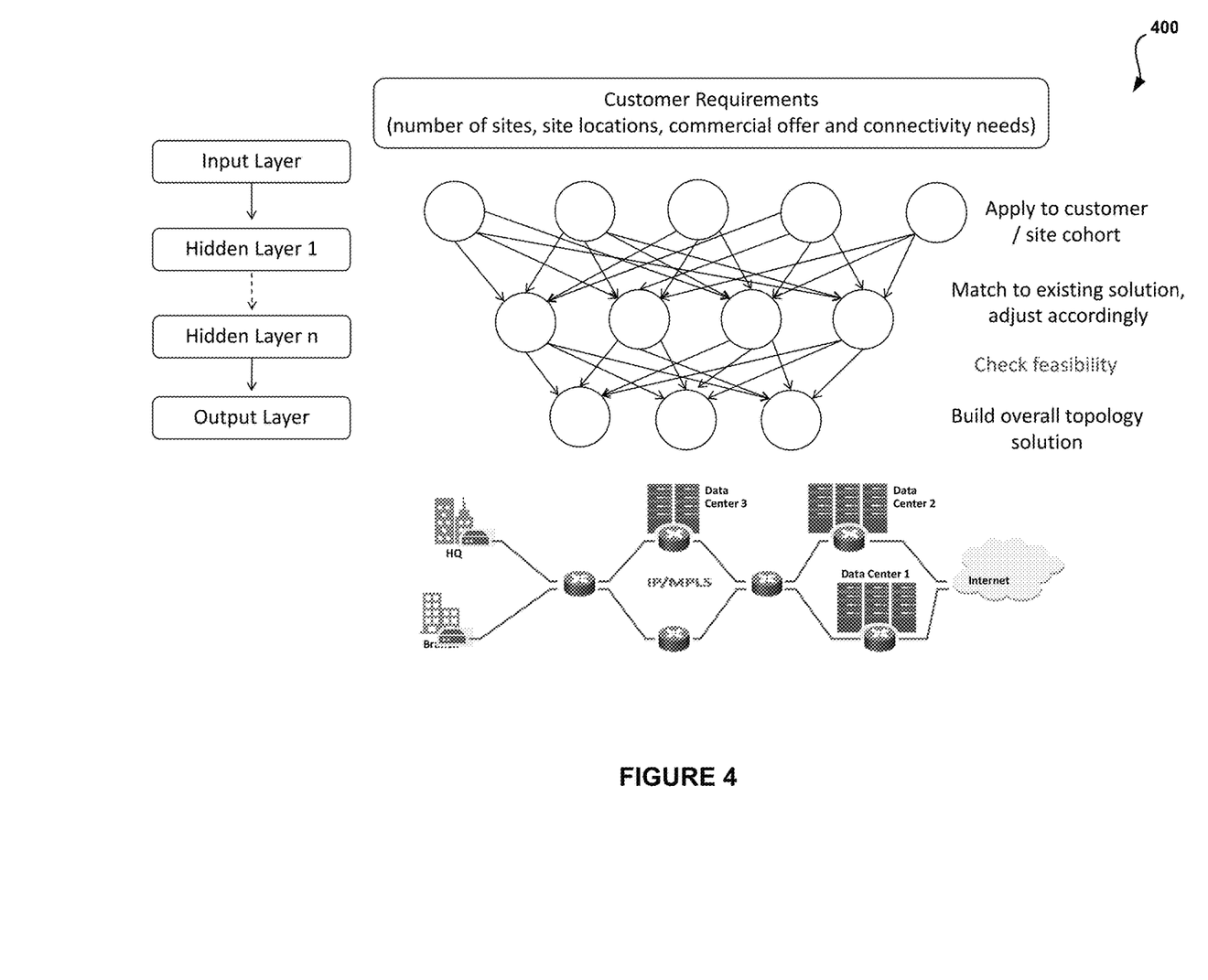
FIG. 4 shows a system flow diagram illustrating various neural layers associated with a neural network deep learning technique capable of being utilized by a network design system, in accordance with one embodiment.

FIG. 4 shows a system flow diagram 400 illustrating various neural layers associated with a neural network deep learning technique capable of being utilized by a network design system, in accordance with one embodiment. As an option, the system flow diagram 400 may be viewed in the context of the details of the previous figures and/or any subsequent figure(s). Of course, however, the system flow diagram 400 may be viewed in the context of any desired environment. Further, the aforementioned definitions may equally apply to the description below.

In this case, each layer appearing in FIG. 4 represents a set of perceptrons that are organized in the layers and communicate with one another. The network design system may generate new layers based on successful creation of existing topologies. This will take into account the need for integration to an inventory system in order to make sure resources are indeed available at the location selected (e.g. as well as an option for a co-hosted solution within single resource, etc.).

Artificial neural networks is a computational approach that would behave very similarly to the biological neural networks in the human brain. Artificial neural networks is based on a large collection of simple artificial neural units (perceptrons), where each artificial neural unit is connected with many others and has a specific task. Upon receiving a set of data, the artificial neural unit would handle a task until reaching a certain threshold and then communicate the output to the system. While each layer handles a set of tasks, there can be many layers and therefore this approach is referred to as deep learning.

The network design system may, in one embodiment, build more than three layers, including two hidden layers, with one layer breaking down customer sites and segmenting the correct solution for each. Another layer may be utilized to identify the correct combination of topology and site to site connectivity while employing another hidden layer to be utilized in case a specific HQ/site less topology (e.g. a cloud warehouse, etc.) is required.

One benefit for the layering solution implemented by the network design system is the ability to extend such technique to more advance technologies and service design topologies as new offers emerge, by adding more layers and applying the neural network computational approach to the layer. In various embodiments, the illustrated deep learning model may be implemented by the network design system using different deep learning models such as convolutional neural networks, deep restricted Boltzmann machines, stacked auto-encoders, overfitting and many more.

The network design system may utilize any designated service and resource topology visualization tool for presenting the generated or recommended network service design. The network design system produces the optimal service and resource topology design, which may be presented later to a customer or agent for approval or editing.

The network design system has the ability to make educated decisions based on past learning and the ability to intelligently use heuristics that eliminate the work and effort previously assigned to engineers.

Figure 5:
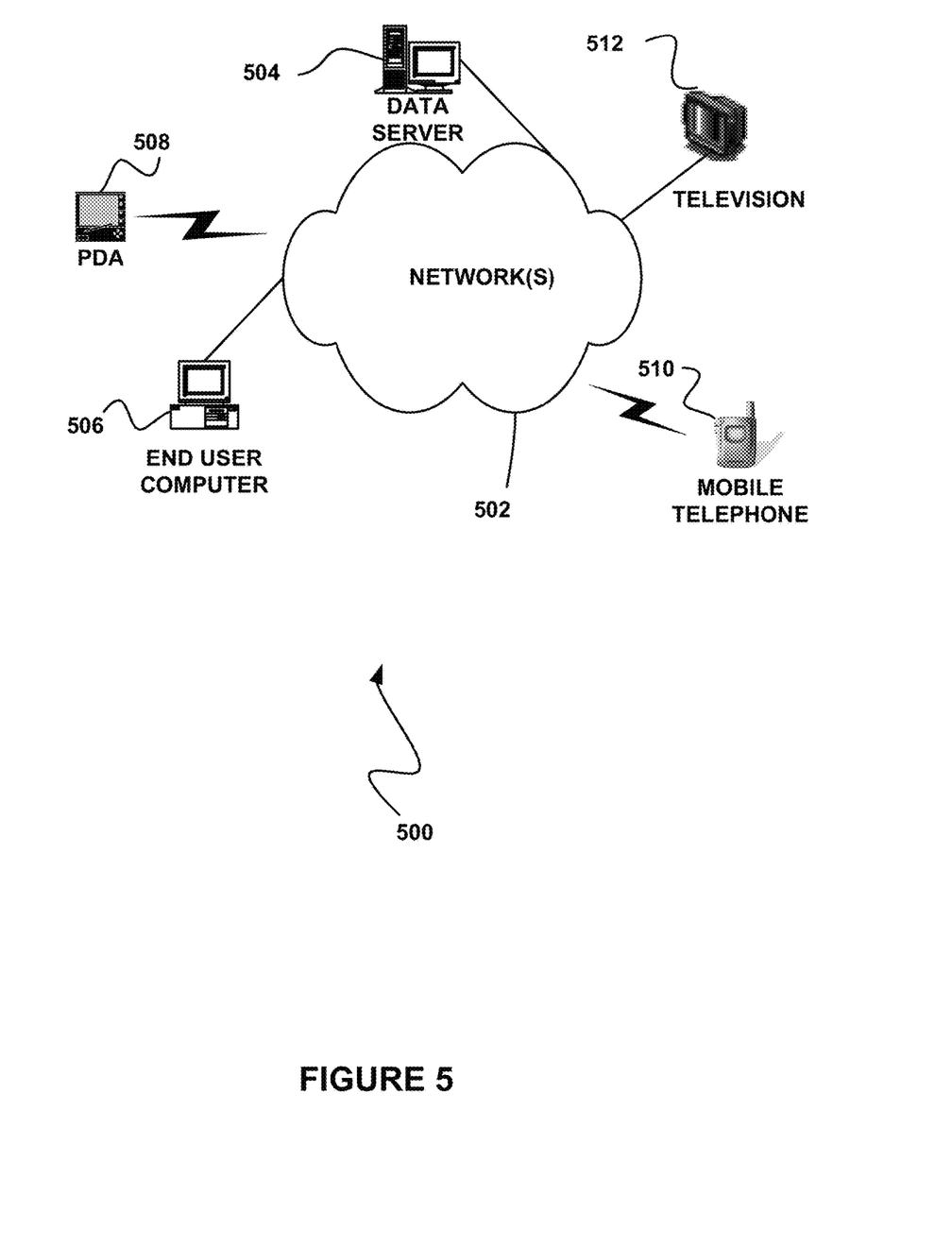
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
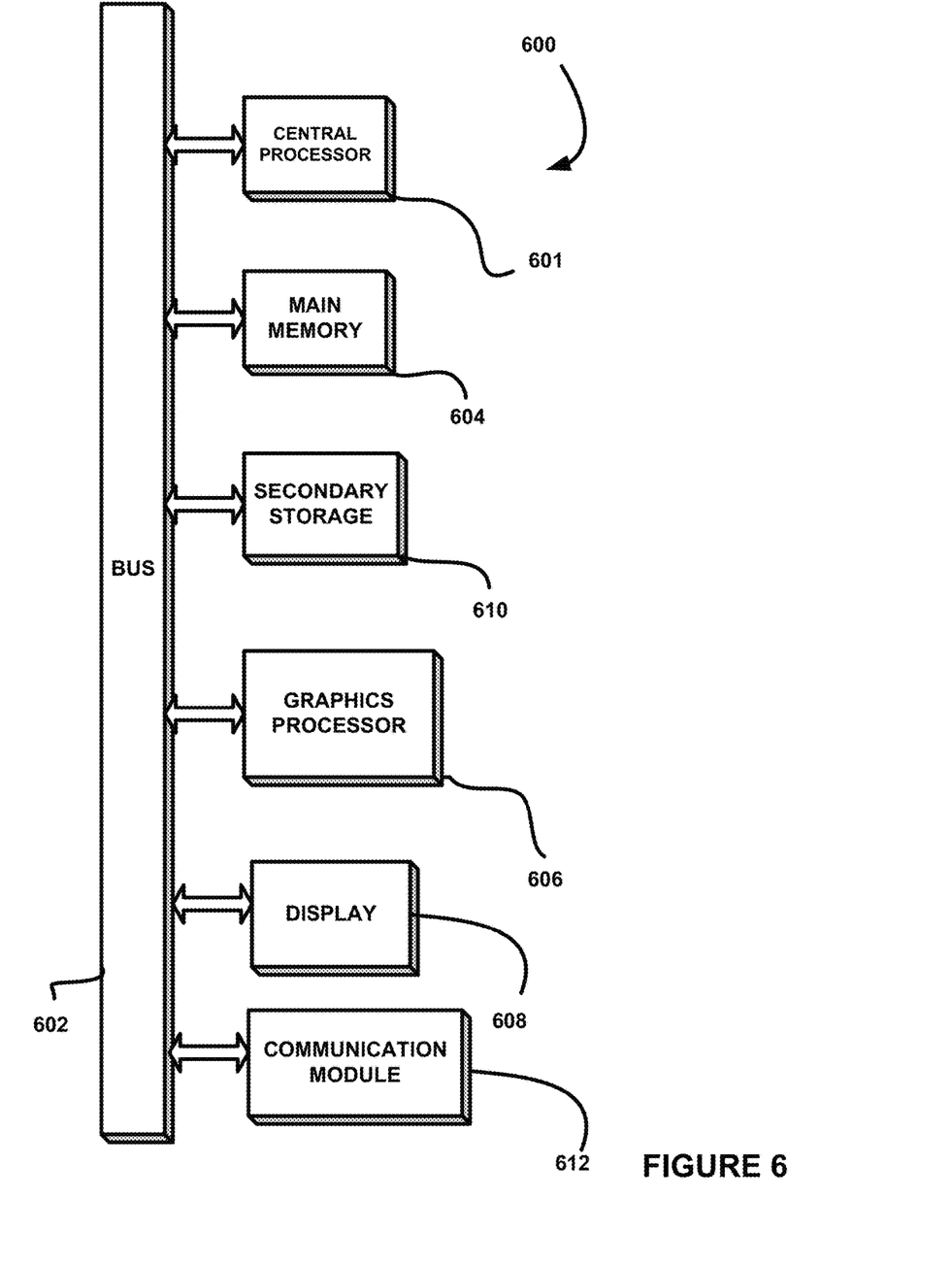
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a network design system, an enterprise network service design project to design;
   receiving, by the network design system, business requirement information associated with the enterprise network service design project;
   receiving, by the network design system, commercial requirement information associated with the enterprise network service design project; and
   inputting to at least one neural network of the network design system:
      a current inventory of a communication service provider to implement the network service design project, and
      information in one or more historical project databases indicating previously designed network topologies for other enterprise service network design projects;
   processing the input, by the at least one neural network, to automatically identify a topology and inventory items to generate the enterprise network service design project, wherein the at least one neural network allocates identification tasks to a plurality of neural layers for selecting the topology and inventory items as an optimal service design solution for the enterprise network service design project;
   wherein the optimal service design solution is built in layers, including at least a first layer segmenting a correct solution for each of a plurality of customer sites, a second layer identifying a correct combination of customer site topology and connectivity between the customer sites, and a third layer for a site-less topology.

2. The method of claim 1, wherein the information in the one or more historical project databases further indicates equipment associated with each of the previously designed network topologies.

3. The method of claim 1, further comprising generating, by the network design system, the optimal service design solution utilizing the topology and the inventory items.

4. The method of claim 1, further comprising recommending, by the network design system, the optimal service design solution utilizing at least one user interface.

5. The method of claim 1, wherein the topology and inventory items are further identified by the neural network based on the business requirement information and the commercial requirement information.

6. A computer program product embodied on a non-transitory computer readable medium, comprising computer code for:
   identifying, by a network design system, an enterprise network service design project to design;
   receiving, by the network design system, business requirement information associated with the enterprise network service design project;
   receiving, by the network design system, commercial requirement information associated with the enterprise network service design project; and
   inputting to at least one neural network of the network design system:
      a current inventory of a communication service provider to implement the network service design project, and
      information in one or more historical project databases indicating previously designed network topologies for other enterprise service network design projects;
   processing the input, by the at least one neural network, to automatically identify a topology and inventory items to generate the enterprise network service design project, wherein the at least one neural network allocates identification tasks to a plurality of neural layers for selecting the topology and inventory items as an optimal service design solution for the enterprise network service design project;
   wherein the optimal service design solution is built in layers, including at least a first layer segmenting a correct solution for each of a plurality of customer sites, a second layer identifying a correct combination of customer site topology and connectivity between the customer sites, and a third layer for a site-less topology.

7. The computer program product of claim 6, wherein the information in the one or more historical project databases further indicates equipment associated with each of the previously designed network topologies.

8. The computer program product of claim 6, further comprising computer code for generating, by the network design system, the optimal service design solution utilizing the topology and the inventory items.

9. The computer program product of claim 6, further comprising computer code for recommending, by the network design system, the optimal service design solution utilizing at least one user interface.

10. A network design system, comprising one or more processors, operable for:
    identifying, by the network design system, an enterprise network service design project to design;

receiving, by the network design system, business requirement information associated with the enterprise network service design project;

receiving, by the network design system, commercial requirement information associated with the enterprise network service design project; and inputting to at least one neural network of the network design system:

a current inventory of a communication service provider to implement the network service design project, and information in one or more historical project databases indicating previously designed network topologies for other enterprise service network design projects;

processing the input, by the at least one neural network, to automatically identify a topology and inventory items to generate the enterprise network service design project, wherein the at least one neural network allocates identification tasks to a plurality of neural layers for selecting the topology and inventory items as an optimal service design solution for the enterprise network service design project;

wherein the optimal service design solution is built in layers, including at least a first layer segmenting a correct solution for each of a plurality of customer sites, a second layer identifying a correct combination of customer site topology and connectivity between the customer sites, and a third layer for a site-less topology.

11. The network design system of claim 10, wherein the information in the one or more historical project databases further indicates equipment associated with each of the previously designed network topologies.

12. The network design system of claim 10, wherein the network design system is further operable for generating, by the network design system, the optimal service design solution utilizing the topology and the inventory items.

* * * * *